US008484375B2

(12) United States Patent
Smith, Jr. et al.

(10) Patent No.: US 8,484,375 B2
(45) Date of Patent: Jul. 9, 2013

(54) SYSTEMS AND METHODS FOR REMOVING STALE MAPPING ENTRIES FOR NETWORK ELEMENT

(75) Inventors: Albert Vinson Smith, Jr., Richardson, TX (US); Xinxin Sun, Allen, TX (US); Nhung Thuy Tran, Lewisville, TX (US); Nasir Iqbal Amanullah, Garland, TX (US)

(73) Assignee: Fujitsu Limited, Kawasaki-shi (JP)

( * ) Notice: Subject to any disclaimer, the term of this patent is extended or adjusted under 35 U.S.C. 154(b) by 409 days.

(21) Appl. No.: 12/834,112

(22) Filed: Jul. 12, 2010

(65) Prior Publication Data

US 2012/0011278 A1    Jan. 12, 2012

(51) Int. Cl.
*G06F 15/173* (2006.01)
*G06F 15/16* (2006.01)

(52) U.S. Cl.
USPC ............ 709/242; 709/232; 709/239; 709/238

(58) Field of Classification Search
USPC .................................. 709/242, 232, 239, 238
See application file for complete search history.

(56) References Cited

U.S. PATENT DOCUMENTS

| | | | | |
|---|---|---|---|---|
| 5,860,136 A * | 1/1999 | Fenner | ............................ | 711/201 |
| 5,925,137 A * | 7/1999 | Okanoue et al. | ................ | 714/4.1 |
| 6,615,273 B1 * | 9/2003 | Pan | ................................ | 709/242 |
| 6,731,632 B1 * | 5/2004 | Takahashi et al. | ............. | 370/392 |
| 7,181,534 B2 * | 2/2007 | Semaan et al. | ................. | 709/245 |
| 7,272,116 B1 * | 9/2007 | Houchen | ........................ | 370/258 |
| 2005/0047350 A1 * | 3/2005 | Kantor et al. | .................. | 370/254 |
| 2008/0075100 A1 * | 3/2008 | Tokunaga et al. | .............. | 370/410 |
| 2009/0252033 A1 * | 10/2009 | Ramakrishnan et al. | ...... | 370/228 |
| 2009/0285213 A1 * | 11/2009 | Chen et al. | ..................... | 370/392 |
| 2009/0296710 A1 * | 12/2009 | Agrawal et al. | ................ | 370/392 |
| 2010/0172302 A1 * | 7/2010 | Dunk | ............................. | 370/328 |

* cited by examiner

*Primary Examiner* — Karen Tang
(74) *Attorney, Agent, or Firm* — Baker Botts L.L.P.

(57) ABSTRACT

A method may include updating a routing table on a first network element based on a shortest path first calculation in response to a network change event. For each deletion from the routing table, a message may be broadcasted to a second network element adjacent to the first network element indicative of such deletion, the message including a target identifier (TID) associated with such deleted entry, wherein the second network element is configured to invalidate its associated TID address resolution protocol (TARP) cache in response to receiving the message. For each deletion from the routing table, a local TARP cache of the first network element may be searched to determine if an entry exists in the local TARP cache mapping the TID associated with such entry to a NASP associated with such entry. The local TARP cache may be invalidated in response to determining that the entry exists.

15 Claims, 3 Drawing Sheets

SYSTEMS AND METHODS FOR REMOVING STALE MAPPING ENTRIES FOR NETWORK ELEMENT

TECHNICAL FIELD

This invention relates generally to the field of communications systems and more specifically to removing stale mapping entries for a network element.

BACKGROUND

A communication network includes network elements that route packets through the network, predominantly in line card hardware. To route packets, network elements often utilize intermediate system to intermediate system (ISIS) protocol. In certain cases, multiple ISIS instances will be instantiated on a network element, to allow for parallel processing, routing and redundancy.

Individual network elements may be identified by a terminal identifier (TID). TID Address Resolution Protocol (TARP) is commonly used to map such TIDs to a Network Service Access Point (NSAP) address associated with an ISIS instance. However, a network element may be configured with such that TARP supports the mapping of a TID to one NSAP address, regardless of the number of ISIS instances present on such a network element. Accordingly, when performing a mapping on a multiple ISIS instance network element, the TID may be mapped to only one of the multiple NSAP addresses. Thus, to other network elements, a multiple ISIS instance network element appears as a single ISIS instance network element.

Accordingly, a TID to NSAP address mapping for a multiple ISIS instance network element may become stale when a link failure, other network failure or link disconnection occurs due to the fact that a single TID is shared among the multiple ISIS instances. When such a disconnection occurs and a TID is mapped to the NSAP address of the network element reachable via the failed link, all traffic to the network element may be dropped despite the fact that an alternative path may exist to the network element.

Traditionally, the problem of stale mappings is addressed by using TARP age timers, which expire stale TARP mappings after a certain interval of time. However, this approach has its disadvantages, as TARP age timer intervals are relatively long which may cause connectivity to be down for a long time. Shortening age timer intervals is often not a viable solution, as shortening timer intervals would increase network traffic.

SUMMARY OF THE DISCLOSURE

In accordance with the present invention, disadvantages and problems associated with removing stale mapping entries for a network element may be reduced or eliminated.

According to one embodiment, a method for removing stale mapping entries in a network element may include updating a routing table on a first network element based on a shortest path first calculation in response to a network change event. For each deletion from the routing table, a message may be broadcasted to a second network element adjacent to the first network element indicative of such deletion, the message including a target identifier (TID) associated with such deleted entry, wherein the second network element is configured to invalidate its associated TID address resolution protocol (TARP) cache in response to receiving the message, wherein the TARP cache associated with the second network element includes a mapping of each of one or more TIDs to a corresponding Network Access Service Protocol (NASP) address associated with an intermediate system to intermediate system (ISIS) routing engine instance instantiated on a network element identified by such TID. For each deletion from the routing table, a local TARP cache of the first network element may be searched to determine if an entry exists in the local TARP cache mapping the TID associated with such entry to a NASP associated with such entry. The local TARP cache may be invalidated in response to determining that the entry exists.

Certain embodiments of the invention may provide one or more technical advantages. A technical advantage may be a method and system that leverages existing detection of network change conditions to invalidate stale TARP entries within a specific ISIS instance without relying on TARP aging.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
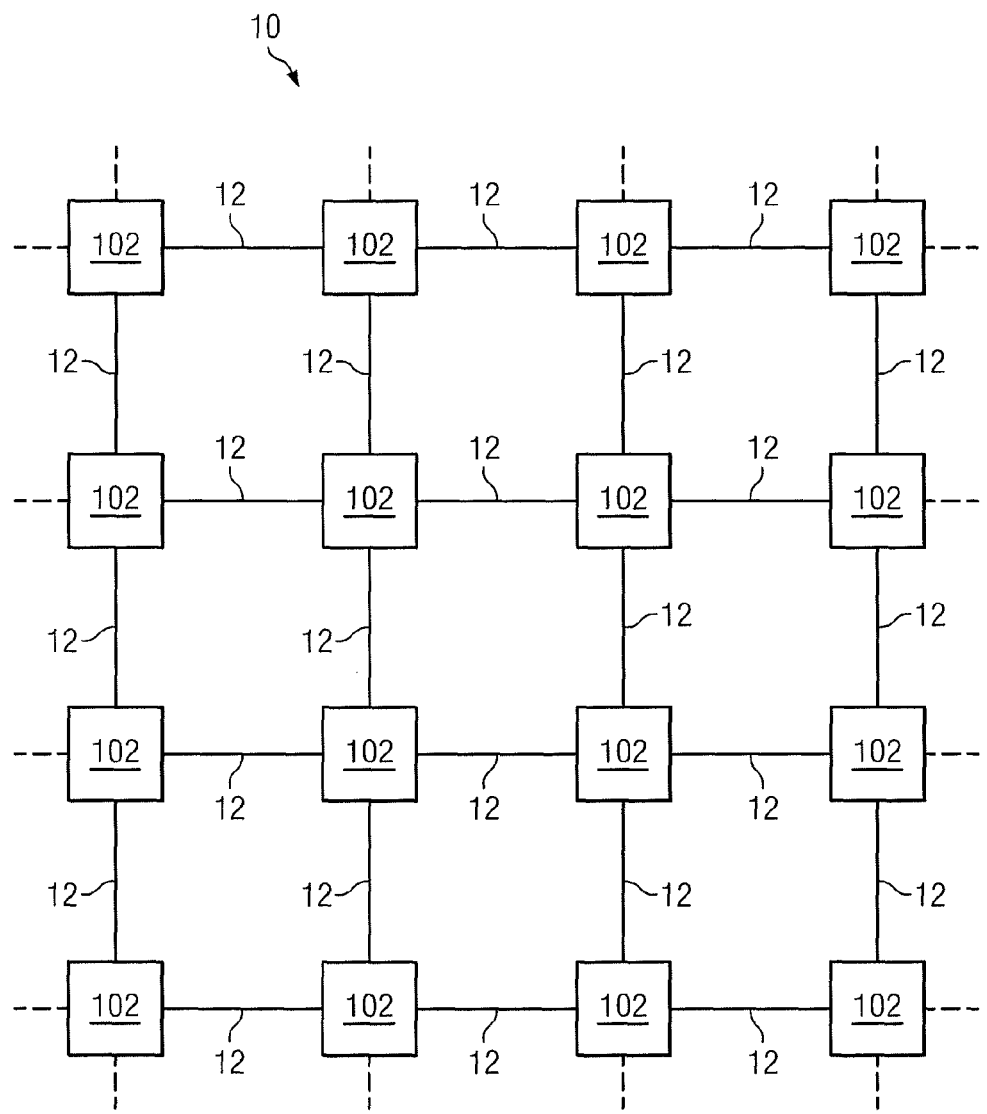
FIG. 1 illustrates a block diagram of an example network, in accordance with certain embodiments of the present disclosure.
Figure 2:
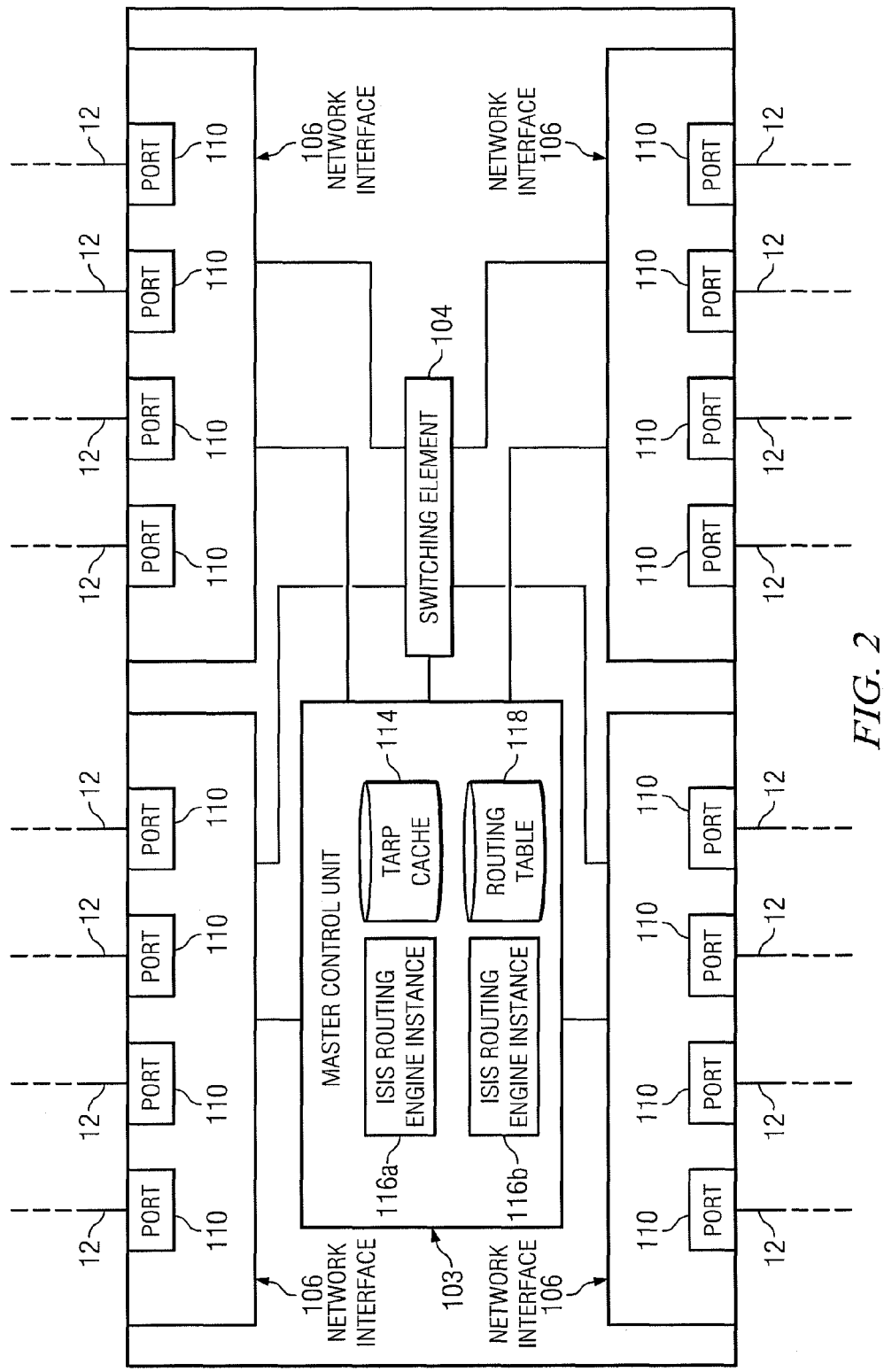
FIG. 2 illustrates a block diagram an example network element, in accordance with certain embodiments of the present disclosure.
Figure 3:
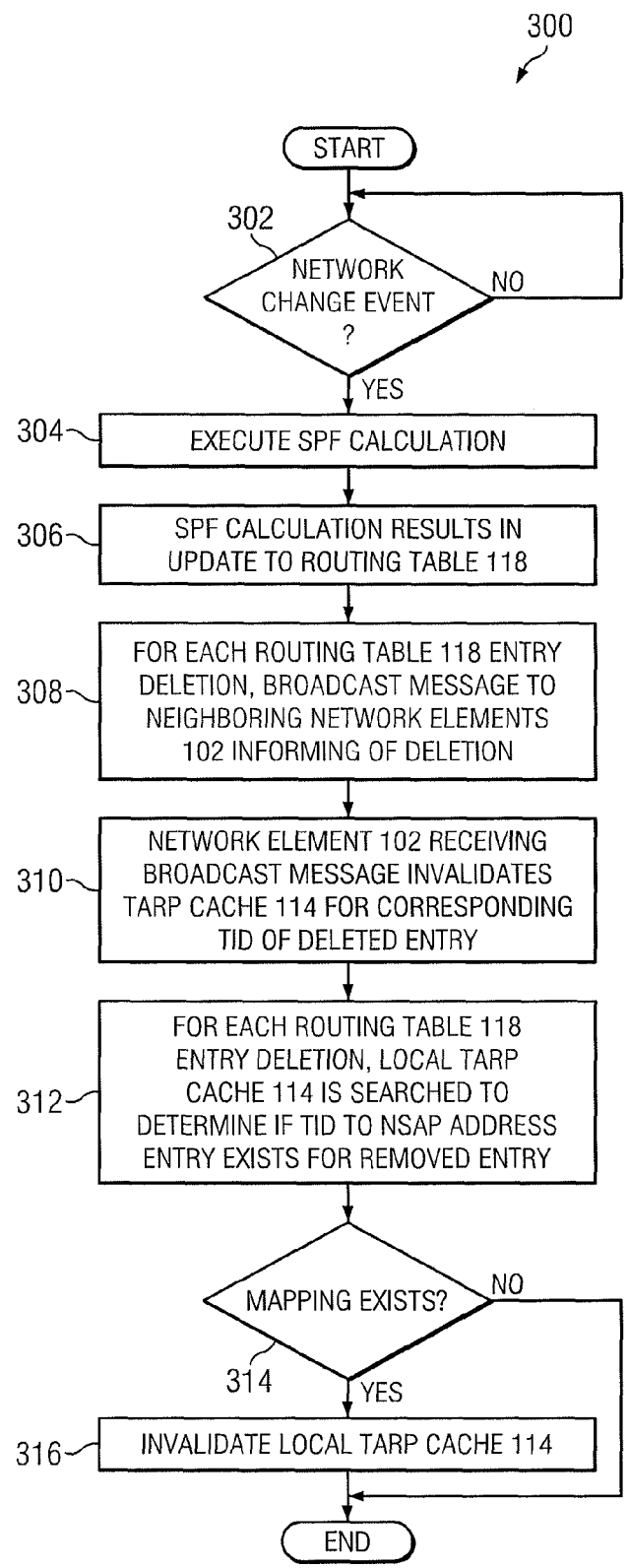
FIG. 3 illustrates a flow chart of an example method for removing stale mapping entries, in accordance with certain embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and ISIS. Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table 118 in accordance with ISIS protocol, or any other suitable protocol, wherein routing table 118 may include any table, database, file, or other data structure configured to maintain information relating a particular ingress port 110 to a corresponding egress port 110.

As shown in FIG. 2, master control unit 103 may include TARP cache 114 and one or more ISIS routing engine instances 116. TARP cache 114 may be stored in memory and/or other computer readable media, and may include a file, map, list, database, table, or other suitable data structure configured to store entries mapping TIDs for one or more network elements 102 to corresponding NSAP addresses associated with ISIS instances.

Each ISIS routing engine instance 116 (e.g., ISIS routing engine instances 116a and 116b), may include any system, apparatus, or device configured to manage ISIS routing for the network element 102 for which such ISIS routing engine instance 116 is instantiated.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

In operation, network elements 102 may use shortest path first (SPF) algorithms and routing table 118 to determine when to invalidate TARP cache 114 entries, as described in greater detail with reference to FIG. 3, below. In short, when a network change event occurs (e.g., link disconnection, link failure, etc.), a network element 102 may perform an SPF calculation which will cause forwarding entries in routing table 118 to be created, modified, or deleted. Upon each change, network elements 102 may invalidate TARP cache 114 entries for TID to NSAP entries deleted from routing table 118. Such invalidation will cause TID to NSAP resolution to reoccur, thus effectively replacing a stale TARP cache 114 entry with a valid one.

FIG. 3 illustrates a flow chart of an example method 300 for removing stale mapping entries, in accordance with certain embodiments of the present disclosure. According to one embodiment, method 300 may begin at step 302. As noted above, teachings of the present disclosure may be implemented in a variety of configurations of network 10. As such, the preferred initialization point for method 300 and the order of the steps 302-316 comprising method 300 may depend on the implementation chosen.

At step 302, a network element 102 may determine if a network change event (e.g., failed link, disconnected link, added link, etc.) has occurred. If a network change event has occurred, method 300 may proceed to step 304. Otherwise, if a network change event has not occurred, step 302 may repeat.

At step 304, network element 102 may execute an SPF calculation in response to the network change event. At step 306, the SPF calculation may result in updates to routing table 118, including additions, modifications, or deletions of entries from routing table 118.

At step 308, for each routing table 118 entry deletion, network element 102 may broadcast a message to its neighboring network elements 102 informing of the deletion. In some embodiments, such message may include a TARP Type 4 packet data unit. At step 310, neighboring network elements 102 receiving the broadcast message may invalidate their respective TARP caches 114 for the TID corresponding to the deleted routing table 118 entry. As a result, stale entries are removed from TARP caches 114 on the neighboring network elements 102, and TID to NSAP address resolution may reoccur on each neighboring network element 102 at the next packet transfer from such neighboring network element 102 to the network element 102 originating the broadcast message.

At step 312, for each routing table 118 entry deletion, network element 102 may search its local TARP cache 114 to determine if a TID-to-NSAP address entry exists for the entry removed from routing table 118. At step 314, if it is determined that a TID-to-NSAP address entry exists for the entry removed from routing table 118, method 300 may proceed to step 316. Otherwise, if it is determined that a TID-to-NSAP address entry does not exist for the entry removed from routing table 118, method 300 may end.

At step 316, in response to determining that a TID-to-NSAP address entry exists in the local TARP cache 114 for the entry removed from routing table 118, network element 102 may invalidate its local TARP cache 114. As a result, stale entries are removed from the local TARP cache 114, and TID to NSAP address resolution may reoccur on network element 102 at the next packet transfer from network element 102 to another network element 102.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network 10 or any other system operable to implement method 300. In certain embodiments, method 300 may be implemented partially or fully in software and/or firmware embodied in computer-readable media.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for removing stale mapping entries in a network element, comprising:
   updating a routing table on a first network element based on a shortest path first calculation in response to a network change event;
   for each deletion from the routing table, broadcasting a message to a second network element adjacent to the first network element indicative of such deletion, the message including a target identifier (TID) associated with such deleted entry, wherein the second network element is configured to invalidate an associated TID address resolution protocol (TARP) cache in response to receiving the message, wherein the TARP cache associated with the second network element includes a mapping of each of one or more TIDs to a corresponding Network Access Service Protocol (NASP) address associated with an intermediate system to intermediate system (ISIS) routing engine instance instantiated on a network element identified by such TID;
   for each deletion from the routing table, searching a local TARP cache of the first network element to determine if an entry exists in the local TARP cache mapping the TID associated with such entry to a NASP associated with such entry;
   invalidating the local TARP cache in response to determining that the entry exists; and
   performing TARP resolution on the first network element after invalidation of the local TARP cache.

2. A method according to claim 1, wherein the message is a TARP Type 4 packet data unit.

3. A method according to claim 1, further comprising performing TARP resolution on the second network element after invalidation of the TARP cache associated with the second network element.

4. A method according to claim 3, wherein the TARP resolution is performed upon the transfer of the first packet occurring after invalidation of the TARP cache from the second network element to the first network element.

5. A method according to claim 1, wherein the TARP resolution is performed upon the transfer of the first packet occurring after invalidation of the local TARP cache from the first network element to the second network element.

6. A network element, comprising:
   a plurality of intermediate system to intermediate system (ISIS) routing engine instances;
   one or more network interfaces configured to communicatively couple the network element to a second network element, the one or more network interfaces including, in the aggregate, a plurality of physical ports; and
   a non-transitory computer-readable medium having stored thereon:
      a target identifier (TID) address resolution protocol (TARP) cache, the TARP cache including a mapping of each of one or more TIDs to a corresponding Network Access Service Protocol (NASP) address associated with an ISIS routing engine instance instantiated on a network element identified by such TID;

a routing table including information for routing traffic among the plurality of ports;

wherein the network element is configured to:
update the routing table based on a shortest path first calculation in response to a network change event;

for each deletion from the routing table, broadcast a message to the second network element indicative of such deletion, the message including a TID associated with such deleted entry, wherein the second network element is configured to a second TARP cache associated with the second network element in response to receiving the message;

for each deletion from the routing table, search the TARP cache to determine if an entry exists in the TARP cache mapping the TID associated with such entry to a NASP associated with such entry;

invalidate the local TARP cache in response to determining that the entry exists; and perform TARP resolution on the network element after invalidation of the TARP cache.

7. A network element according to claim 6, wherein the message is a TARP Type 4 packet data unit.

8. A network element according to claim 6, the second network element further configured to perform TARP resolution on the second network element after invalidation of the TARP cache associated with the second network element.

9. A network element according to claim 8, wherein the second network element is configured to perform the TARP resolution upon the transfer of the first packet occurring after invalidation of the TARP cache from the second network element to the network element.

10. A network element according to claim 6, wherein the TARP resolution is performed upon the transfer of the first packet occurring after invalidation of the TARP cache from the network element to the second network element.

11. A non-transitory computer-readable medium, comprising:

logic for updating a routing table on a first network element based on a shortest path first calculation in response to a network change event;

logic for broadcasting a message, for each deletion from the routing table, to a second network element adjacent to the first network element indicative of such deletion, the message including a terminal identifier (TID) associated with such deleted entry, wherein the second network element is configured to invalidate an associated TID address resolution protocol (TARP) cache in response to receiving the message, wherein the TARP cache associated with the second network element includes a mapping of each of one or more TIDs to a corresponding Network Access Service Protocol (NASP) address associated with an intermediate system to intermediate system (ISIS) routing engine instance instantiated on a network element identified by such TID;

logic for searching a local TARP cache of the first network element for each deletion from the routing table, to determine if an entry exists in the local TARP cache mapping the TID associated with such entry to a NASP associated with such entry;

logic for invalidating the local TARP cache in response to determining that the entry exists; and logic for performing TARP resolution on the first network element after invalidation of the local TARP cache.

12. A non-transitory computer-readable medium according to claim 11, wherein the message is a TARP Type 4 packet data unit.

13. A non-transitory computer-readable medium according to claim 11, further comprising the second network element configured to perform TARP resolution on the second network element after invalidation of the TARP cache associated with the second network element.

14. A non-transitory computer-readable medium according to claim 13, wherein the TARP resolution is performed upon the transfer of the first packet occurring after invalidation of the TARP cache from the second network element to the first network element.

15. A non-transitory computer-readable medium according to claim 11, wherein the TARP resolution is performed upon the transfer of the first packet occurring after invalidation of the local TARP cache from the first network element to the second network element.

\* \* \* \* \*